United States Patent
Feilke et al.

(10) Patent No.: US 12,157,642 B2
(45) Date of Patent: Dec. 3, 2024

(54) TRANSFER DEVICE AND METHOD FOR TRANSFERRING PIECE GOODS BETWEEN CONVEYOR SECTIONS

(71) Applicant: SIEMENS LOGISTICS GMBH, Nuremberg (DE)

(72) Inventors: Robert Feilke, Magdeburg (DE); Karsten Hesse, Abenberg (DE)

(73) Assignee: Siemens Logistics GmbH, Nuremberg (DE)

( * ) Notice: Subject to any disclaimer, the term of this patent is extended or adjusted under 35 U.S.C. 154(b) by 79 days.

(21) Appl. No.: 17/926,704

(22) PCT Filed: Apr. 20, 2021

(86) PCT No.: PCT/EP2021/060153
§ 371 (c)(1),
(2) Date: Nov. 21, 2022

(87) PCT Pub. No.: WO2021/233619
PCT Pub. Date: Nov. 25, 2021

(65) Prior Publication Data
US 2023/0202772 A1    Jun. 29, 2023

(30) Foreign Application Priority Data
May 22, 2020   (EP) .................................... 20175961

(51) Int. Cl.
*B65G 47/52*    (2006.01)
*B65G 15/22*    (2006.01)
*B65G 47/76*    (2006.01)

(52) U.S. Cl.
CPC ............. *B65G 47/52* (2013.01); *B65G 15/22* (2013.01); *B65G 47/766* (2013.01)

(58) Field of Classification Search
None
See application file for complete search history.

(56) References Cited

U.S. PATENT DOCUMENTS

| | | | | |
|---|---|---|---|---|
| 2,247,672 A | * | 7/1941 | Thum | B65G 47/71 |
| | | | | 198/463.4 |
| 5,787,679 A | * | 8/1998 | Lynch | B65G 47/766 |
| | | | | 198/367 |

(Continued)

FOREIGN PATENT DOCUMENTS

| | | | | |
|---|---|---|---|---|
| DE | 102006035050 A1 | * | 1/2008 | ............ B65G 47/52 |
| GB | 1078970 A | | 8/1967 | |
| WO | 0232797 A1 | | 4/2002 | |

*Primary Examiner* — Kavel Singh
(74) *Attorney, Agent, or Firm* — Laurence A. Greenberg; Werner H. Stemer; Ralph E. Locher

(57) ABSTRACT

A device and a method for transferring piece goods between adjacent conveyor sections. A central pivot deflector between the conveyor sections and/or one or two outer pivot deflectors disposed on the outer sides of the conveyor sections can be pivoted about their pivot axes between first and second transfer positions and a passage position. In the transfer position, the pivoting deflector(s) block one of the conveyor sections obliquely from the outer side towards the center strip, so that an item of piece goods is transferred from one conveyor section to the other conveyor section. The pivoting deflectors are mounted substantially at the same level as the conveyor sections in both transfer positions. Thus piece goods can be transferred optionally from the first to the second conveyor section or vice versa at the same level. No item of piece goods is affected in the passage position.

15 Claims, 3 Drawing Sheets

(56) References Cited

U.S. PATENT DOCUMENTS

| | | | |
|---|---|---|---|
| 6,230,874 B1 * | 5/2001 | Steeber | B65G 47/5131 |
| | | | 198/457.06 |
| 6,334,528 B1 * | 1/2002 | Bogle | B65G 47/5131 |
| | | | 198/836.3 |
| 8,544,631 B2 * | 10/2013 | Seger | B65G 47/71 |
| | | | 198/452 |

* cited by examiner

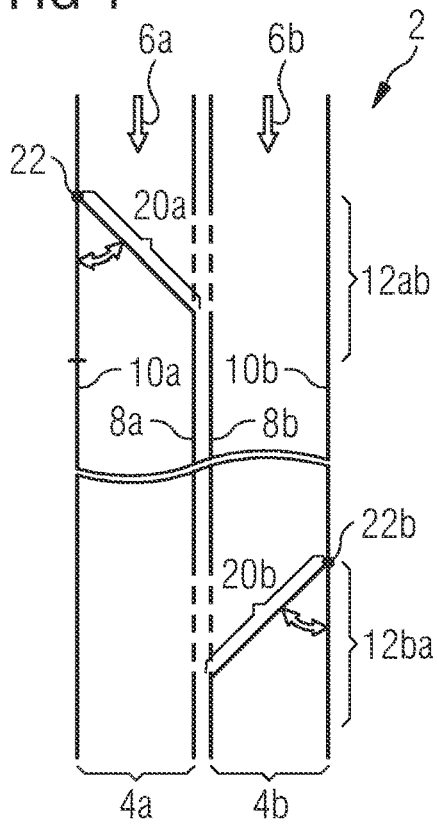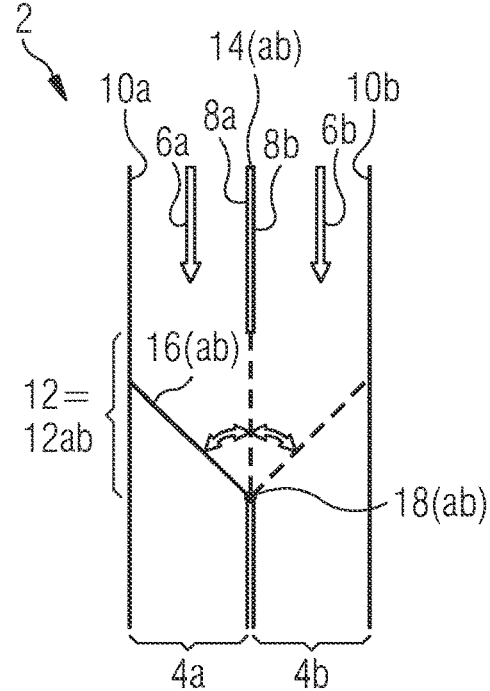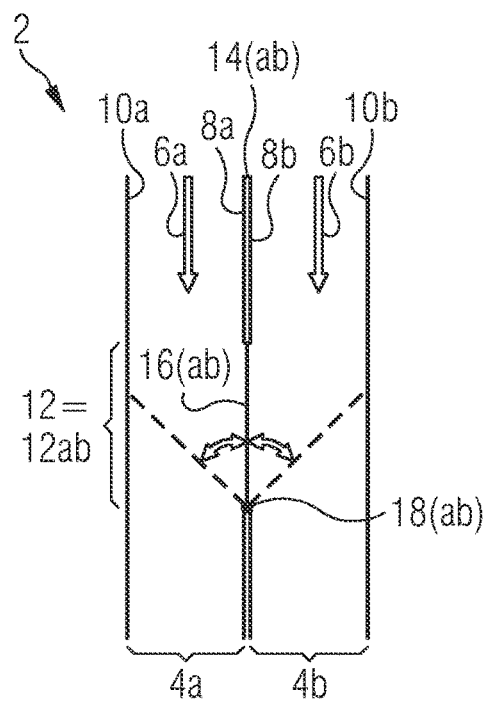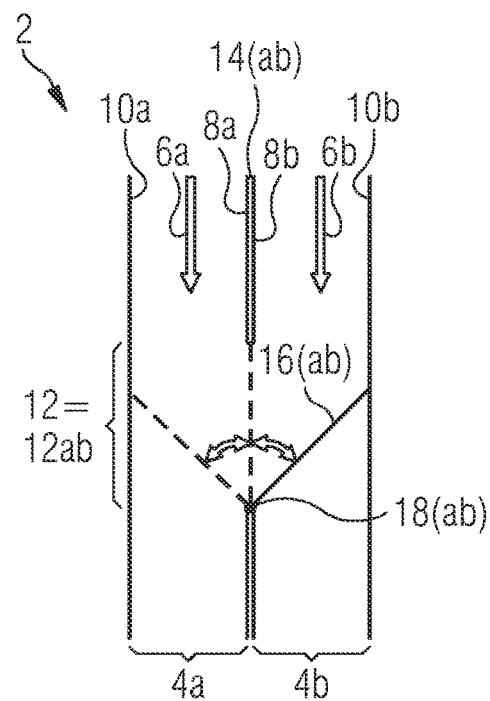

TRANSFER DEVICE AND METHOD FOR TRANSFERRING PIECE GOODS BETWEEN CONVEYOR SECTIONS

FIELD AND BACKGROUND OF THE INVENTION

The present invention relates to conveyor systems for piece goods. The invention can be applied in particular to the transfer of luggage items in luggage conveyor systems at airports, but can also be applied in other ways. The domain of postal logistics with packets and packages is particularly relevant.

The prior art for changing between conveyor sections in belt conveyor systems takes the form of a band deflector (high-speed diverter) which conveys piece goods straight along a conveyor section or transports piece goods from a first conveyor section onto a second, receiving conveyor section (but not vice versa). A receiving conveyor must then be available on the second conveyor section. For movements in the opposite direction, from the second conveyor section to the first conveyor section, a further band deflector and a further receiving conveyor are required. A complete transposition therefore requires two band deflectors and two receiving conveyors, and is consequently very lengthy and demanding of space. There are often situations in which this solution cannot be applied, or can only be applied by accepting other problems, primarily concerning spatial restrictions in existing sorting systems and restrictions in respect of control. Existing solutions for transposition are often derived from the domain of high-performance sorting and are therefore optimized for high speeds in particular, even if these high performance requirements are not necessary.

SUMMARY OF THE INVENTION

The object of the present invention is therefore to provide a transposition solution which is more compact and more versatile. This object is achieved by a device and a method having the features in the independent claims. Advantageous embodiments of the invention are specified in the subclaims.

The inventive solution involves a transfer device. The transfer device comprises a first and a second conveyor section, respectively having a first and a second conveying direction, a first and a second inner side, and a first and a second outer side, said conveyor sections in a transfer region being arranged next to each other with substantially parallel conveying directions and being separated from each other by a center strip that is arranged between the inner sides thereof. The transfer device comprises one or more pivoting deflectors with respective pivot axes which are arranged at the side of the first or second conveyor section and about which the pivoting deflector can pivot, wherein said pivoting deflector or pivoting deflectors are arranged and can be triggered in such a way that the transfer device has a first and a second transfer position and a passage position. In the first or second transfer position, one or more of the pivoting deflectors block the first or second conveyor section in the transfer region by means of an arrangement extending transversely to the conveying direction or obliquely from the first or second outer side in a conveying direction towards the center strip, so that an item of piece goods is transferred from the first or second conveyor section to the second or first conveyor section respectively, the pivoting deflectors in the first and second transfer position being arranged at substantially the same level of the conveyor sections, so that piece goods at the same level can be transferred from either the first to the second or the second to the first conveyor section. In the passage position, one or more of the pivoting deflectors are arranged parallel to the center strip, so that items of piece goods on the conveyor section or conveyor sections are not affected.

The transfer device comprises a pivoting device for the purpose of pivoting the one or more pivoting deflectors into the transfer positions and into the passage position(s).

A lateral arrangement describes an arrangement at or on the inner or outer side. Strictly speaking, the transfer device has a respective passage position for each conveyor section. In the case of a single, central pivoting deflector, the passage positions of both conveyor sections nonetheless correspond.

A pivoting deflector is a device for diverting an item of piece goods from one conveyor section to the other. This includes both one-part pivoting deflectors which block the whole conveyor section in a transfer position, and multi-part pivoting deflectors which operate in a wing-like manner, whereby in a transfer position two pivoting deflectors block the conveyor section in a co-linear or co-planar arrangement. In the first or second transfer position, the one or more pivoting deflectors are thus pivoted into either the first or the second conveyor section, so that they divert the flow of piece goods either from the first to the second conveyor section or vice versa. In the passage position, the pivoting deflectors in the transfer region separate the first and the second conveyor section from each other or are arranged along one of the outer sides. If the pivoting deflector in the first transfer position is pivoted into the region of the first conveyor section, an item of piece goods is transferred from the first conveyor section to the second conveyor section. If the pivoting deflector in the second transfer position is pivoted into the region of the second conveyor section, an item of piece goods is transferred from the second conveyor section to the first conveyor section.

If the pivoting deflector has more than one part, the pivoting device is so embodied as to pivot the relevant parts by triggering them in a concerted manner and, in order to achieve this, comprises one or more motors for driving the pivoting deflectors and further movable components if necessary.

The center strip can either be a center line with little or no vertical restriction, or have a structural boundary with an opening in the transfer region. The width of the center strip can likewise vary.

A conveyor section in the sense of the invention is understood to be in particular a (not necessarily continuous) band conveyor. The designations inner side and outer side relate to the positioning of the conveyor sections relative to each other, while the designations first conveyor section and second conveyor section are interchangeable. Substantially parallel conveying directions are understood to also include conveyor sections which are arranged next to each other and have conveying directions that are not perfectly straight. The conveyor sections transport piece goods in the same, non-opposing directions and are consequently not antiparallel.

A transfer is understood to mean a change of an item of piece goods from one conveyor section to the other, i.e. a change of track or line. The invention allows a selective change of track at the same transfer position, i.e. at the same level of the conveyor sections, in both directions.

The inventive solution can be further improved by means of various embodiments which are individually advantageous and can be combined with each other as desired unless otherwise stated. The embodiment variants and their associated advantages are explained in the following.

According to an embodiment variant, the one or more pivoting deflectors can each have a distal and a proximal end and be embodied as a central pivoting deflector and/or as one or two outer pivoting deflectors. The central pivoting deflector can pivot at its proximal end about its center pivot axis, this being arranged on and substantially orthogonal to the center strip. The outer pivoting deflector or pivoting deflectors can pivot at their proximal ends about their outer pivot axis, this being arranged on and substantially orthogonal to the respective outer side. The outer pivot axis or axes can be arranged upstream of or at the same level as the center pivot axis. In the first or second transfer position, the distal end of at least one of the pivoting deflectors can be positioned into the first or second conveyor section respectively, and in the passage position at least one of the pivoting deflectors can be positioned parallel to the center strip, so that in the first or second transfer position an item of piece goods is transferred by means of the one or more pivoting deflectors in the transfer region from the first to the second conveyor section or from the second to the first conveyor section. The pivoting device can be embodied to selectively pivot the outer pivoting deflector at essentially the same time as the central pivoting deflector, into either the transfer positions or the passage position.

The outer pivot axes are not necessarily arranged at the same level, since their positioning is dependent on the length of the one or more outer pivoting deflectors, the length of the center strip pivoting deflector if applicable, and the width of the conveyor sections.

According to an embodiment variant, the central pivoting deflector and the first or second outer pivoting deflector in the first or second transfer position can be positioned in a substantially co-linear manner, so that an item of piece goods is transferred by both the central pivoting deflector and the outer pivoting deflector from its (delivering) conveyor section to the adjacent (receiving) conveyor section. The arrangement is co-linear in plan view, or co-planar transverse to the conveyor surface.

If more than two conveyor sections are adjacently arranged, the outer pivoting deflector can act as a further central pivoting deflector, one of the outer sides of a conveyor section then being a further inner side.

Short pivoting times and therefore high flow rates are achieved by using the smallest possible pivoting angles and the shortest possible pivoting deflectors. The pivoting angle is the angle which is enclosed by inner or outer sides of the respective conveyor sections and the pivoting deflector concerned, and which is traversed by the (outer side or center strip) pivoting deflector between passage position and transfer position. Like the width of the conveyor section and the lengths of the pivoting deflectors, the pivoting angles can vary from each other. A compromise must be found between pivoting deflectors which are as short as possible, these having less inertia than longer pivoting deflectors, the necessity for concerted triggering by more than one motor if two pivoting deflectors are used to seal off a conveyor section in a wing-like manner, and the possibility of shorter item spacing when two pivoting deflectors are used. If two pivoting deflectors are used to block the conveyor section the pivoting angle is substantially the same, but a smaller surface needs to be kept free for pivoting and therefore higher sorting performance values can be achieved. Center pivot axes are arranged at the same level or downstream of the outer pivot axes.

In the transfer positions, an outer pivoting deflector and a central pivoting deflector are each arranged in a co-linear or co-planar manner. In the passage position, the central pivoting deflector is arranged on and along the center strip and separates the two conveyor sections completely or only partially depending on the length of the central pivoting deflector in the transfer region.

According to an embodiment variant, the one or more pivoting deflectors, in particular the central pivoting deflector and/or the one or more outer pivoting deflectors, can have drivable diverting surfaces, e.g. in the form of circulating belts, and the pivoting device is so embodied as to drive these diverting surfaces, preferably at a transfer speed that is adapted to the conveyor speed of the conveyor sections and preferably while the one or more pivoting deflectors are positioned in and/or pivoted into the transfer positions. Items are therefore transferred with particular care, and congestion is avoided.

According to an embodiment variant, the conveyor sections in the transfer region can form a conveyor surface which is level or is only inclined along the conveying directions. It is therefore unnecessary to work against gravity for the transfer, no transfer direction is favored, and unintended line changes are avoided.

In order to support the transfer, the transfer device can comprise an actively drivable or passive conveying means which is arranged on the center strip in the transfer region and is designed to assist the transfer between the conveyor sections. An actively drivable conveying means is driven as a function of the position of the pivot axes—in the first transfer position from the first conveyor section towards the second conveyor section, and vice versa in the second transfer position. Conveying means can be e.g. balls, rollers or bands. Alternatively, the center strip can also be embodied as a center line, such that the center line has no width of its own in the transfer region and the conveyor sections lie directly alongside each other. It is then easy to cross over the center line.

According to an embodiment variant, the transfer device can also comprise a further conveyor section with a further conveying direction, a further inner side and a further outer side, wherein the further conveyor section is arranged next to the second conveyor section with substantially parallel conveying directions in a further transfer region, and is separated therefrom by a further center strip which is arranged between the second outer side and the further inner side. The transfer device can comprise one or more further pivoting deflectors with respective further pivot axes which are arranged at the side of the further conveyor section and about which the one or more further pivoting deflectors can pivot, wherein the one or more further pivoting deflectors are arranged and can be triggered in such a way that the transfer device has a second further and/or a further transfer position. In the second further or in the further transfer position, the one or more further pivoting deflectors can block the second or the further conveyor section in the further transfer region by means of an arrangement extending transversely to the conveying direction or obliquely between the second inner side or the further outer side in a conveying direction towards the further center strip, so that an item of piece goods is transferred from the second or further conveyor section to the further or second conveyor section respectively, wherein the further pivoting deflectors in the second further and the further transfer position can be arranged at substantially the same level of the conveyor sections, so that piece goods at the same level can be transferred either from the second to the further conveyor section or from the further to the second conveyor section. In the passage position, one or more of the further pivoting deflectors can be arranged parallel to the further center strip so that piece goods on the conveyor sections are not affected. The pivoting device can be embodied to pivot the one or more further pivoting deflectors into the further transfer positions and into the passage position.

It should be noted that the further conveyor section can be positioned on both sides of the existing conveyor sections. The second conveyor section is understood here to be one of the existing conveyor sections, such that three or more conveyor sections can be arranged next to each other. As a result of the positioning the further conveyor section, in strictly semantic terms the second outer side also becomes an inner side, but for the sake of simplicity will nonetheless continue to be referred to as the second outer side in the following. The further transfer region can correspond to the existing transfer region wholly, partly or not at all. Like the first or second conveyor section, the further conveyor section can also be equipped with further outer pivoting deflectors, wherein the functionalities of the pivoting deflectors of the second and the further conveyor section can overlap—the further central pivoting deflector can act as a second outer pivoting deflector, etc. Essentially the same applies to the corresponding further pivoting deflectors, pivot axes and elements as to the corresponding elements of the first and second conveyor sections described above.

In order to manage the to and fro movements of the piece goods, the transfer device can comprise one or more conveyor regions which are arranged on one or more of the conveyor sections ahead of and/or behind the transfer region, and which can be driven at a conveyor speed that is both individual and settable in each case. This allows the flow of piece goods to be controlled (distances between successive piece goods, gentle speed changes, etc.). The transfer device can also comprise at least one detection device which detects the flow of piece goods, at least in and/or ahead of and/or behind the transfer region, wherein triggering of the pivoting device and/or the conveyor regions is effected as a function of the flow of piece goods that has been detected.

With regard to a method, the object cited above is achieved by a method for the selective transfer of an item of piece goods from a first to a second conveyor section, these having respectively a first and a second conveying direction, a first and a second inner side and a first and a second outer side. The method comprises the method steps: Transporting an item of piece goods on the first or second conveyor section along the first or second conveying direction towards the transfer region, the conveyor sections in the transfer region being arranged next to each other with substantially parallel conveying directions and being separated from each other by a center strip that is arranged between the inner sides thereof. Pivoting one or more pivoting deflectors about a respective pivot axis, this being arranged at the side of one of the conveyor sections, between a first transfer position, a passage position and a second transfer position. The pivot axes are each arranged orthogonally to and on the center strip between two conveyor sections. In the first or second transfer position, one or more of the pivoting deflectors block the first or second conveyor section in the transfer region by means of an arrangement extending transversely to the conveying direction or obliquely between the first or second outer side and the center strip in a conveying direction, so that in the first or second transfer position, piece goods are transferred at substantially the same level of the conveyor sections either from the first to the second conveyor section or from the second to the first conveyor section. In the passage position, one or more of the pivoting deflectors are arranged parallel to the center strip, so that the piece goods on the conveyor sections are not affected by the pivoting deflector or pivoting deflectors. Transporting the item of piece goods onward through the transfer region and further downstream on one of the conveyor sections.

Where applicable, the method has the same properties and advantages as stated in respect of the proposed method.

According to an embodiment variant, the one or more pivoting deflectors can each have a distal and a proximal end and be embodied as a central pivoting deflector and/or as one or two outer pivoting deflectors. The central pivoting deflector can pivot at its proximal end about its center pivot axis, this being arranged on and substantially orthogonal to the center strip. The one or more outer pivoting deflectors can pivot at their proximal ends about their outer pivot axes, these being arranged on and substantially orthogonal to the respective outer side. The outer pivot axes can be arranged upstream of or at the same level as the center pivot axis. In the first or second transfer position, the distal end of at least one of the pivoting deflectors can pivot into the first or second conveyor section respectively, and in the passage position at least one of the pivoting deflectors can be arranged parallel to the center strip, so that in the first or second transfer position an item of piece goods is transferred by means of the pivoting deflectors in the transfer region from the first to the second conveyor section or from the second to the first conveyor section. Selective and essentially simultaneous pivoting of the one or more outer pivoting deflectors and/or the central pivoting deflector into either the transfer positions or the passage position can be effected.

Each conveyor section has one or more respective outer pivoting deflectors. The outer side pivot axes are not necessarily arranged at the same level.

According to a further embodiment variant, the method can also comprise the method step: Following or actively driving a conveying means which is arranged in the conveyor surface on the center strip in the transfer region, so that the transfer of an item of piece goods between the conveyor sections is assisted. Alternatively, the center strip can also be embodied as a center line, such that the center line has no width of its own in the transfer region.

According to a further embodiment variant, the method can also comprise the method steps: Transporting an item of piece goods on the second or a further conveyor section, wherein said further conveyor section has a further conveying direction, a further inner side and a further outer side, and in a further transfer region the further conveyor section is arranged next to the second conveyor section and is separated therefrom by a further center strip which is arranged between the second outer side and the further inner side, and the second and the further conveyor section have substantially parallel conveying directions in the transfer region. Pivoting one or more of the further pivoting deflectors about a further pivot axis which is arranged at the side of the further conveyor section into at least one further transfer position, into two further transfer positions according to an embodiment variant, or into a passage position, wherein the one or more further pivoting deflectors in the one or more further transfer positions block the second or the further conveyor section by means of an arrangement extending transversely to the conveying direction or obliquely in a conveying direction between the second inner side or further outer side and the further center strip, and in the passage position the one or more further pivoting deflectors are arranged along the further center strip, wherein in the second further or further transfer position the pivoting deflectors are arranged at substantially the same level, so that piece goods at the same level are transferred either from the second to the further conveyor section or from the further to the second conveyor section. Transporting the item of piece goods onward through the further transfer region and further downstream on one of the conveyor sections.

According to a further embodiment variant, the method can also comprise the method step: Triggering conveyor regions which are arranged on the conveyor sections upstream and/or downstream along the conveying directions, ahead of and/or behind the transfer region, using individually settable conveyor speeds in each case.

BRIEF DESCRIPTION OF THE FIGURES

Embodiment variants of the invention are explained in greater detail below with reference to the figures, in which:

FIG. 1 shows a transfer device as per the prior art;

FIG. 2 shows passage and transfer positions using a one-part pivoting deflector;

DETAILED DESCRIPTION OF THE INVENTION

Figure 3A:
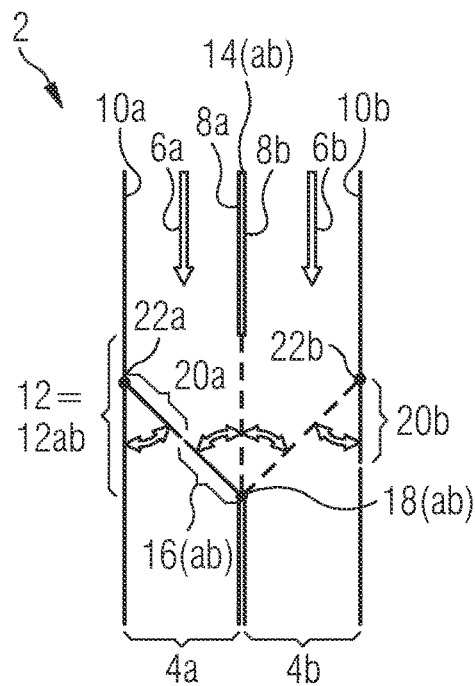
FIG. 3 shows passage and transfer positions with outer pivoting deflectors.

FIG. 1 shows a conventional transfer device 2 comprising two adjacent and parallel conveyor sections 4a,4b with respective conveying directions 6a,6b. The transfer of an item of piece goods from the first to the second conveyor section 4a,4b is achieved by pivoting a first outer pivoting deflector 20a outwards about an outer pivot axis 20 at its proximal end and towards the inner side 8a at its distal end. As a result of cutting off the conveyor path 4a of the item of piece goods in the transfer region 12ab, the outer pivoting deflector 20a diverts the item of piece goods and transfers it to the second conveyor section 6b thus. If it is not intended to divert the flow of piece goods from the first to the second conveyor section 4a,4b, the pivoting deflector 20a is positioned along the outer side 10a. The upper transfer region 12ab only allows a change of line from the first to the second conveyor section 4a,4b. The lower transfer region 12ba only allows a change of line from the second to the first conveyor section 4b,4a, and functions analogously. It is not possible to achieve crossover functionality in one of the transfer regions 12ab,12ba.

FIG. 2 shows a transfer device 2 according to the invention in first transfer position (FIG. 2a), passage position (FIG. 2b) and second transfer position (FIG. 2c). The transfer device 2 comprises a first and a second conveyor section 4a,4b, respectively having a first and a second conveying direction 6a,6a, a first and a second inner side 8a,8b and a first and a second outer side 10a,10b, wherein said conveyor sections 4a,4b in a transfer region 12ab,12 are arranged next to each other with substantially parallel and therefore corresponding conveying directions 6a,6b and are separated from each other by a center strip 14,14ab that is arranged between the inner sides 8a,8b thereof. The center strip 14 between two conveyor sections 4 can be embodied with a vertical separation, or without vertical separation as a line in the sense of a center line so that the conveyor sections 4a,4b lie directly alongside each other without any distance between them, or have a small width such that the directly adjacent conveyor sections 4 do not touch each other. If the center strip 14 as a center line 14 has no width of its own in the transfer region, there is no need for devices or means for assisting an item of piece goods to pass across the center strip itself, e.g. an actively driven or passive conveying means 24 on the center strip 14,14ab in the transfer region 12,12ab. The conveyor sections 4a,4b then lie directly alongside each other without any wider separation 14.

A central pivoting deflector 16,16ab can pivot at its proximal end about a center pivot axis 18,18ab, this being arranged on and substantially orthogonal to the center strip 14, between the first and second transfer position and the passage position. The distal end of the central pivoting deflector 16 in the first or second transfer position is positioned respectively towards the first or second outer side 10a,10b in the first or second conveyor section 4a,4b. In the passage position, the central pivoting deflector 16 is positioned along the center strip 14,14ab, and the transport path of the item of piece goods is not affected by the central pivoting deflector 16 in the transfer region.

The term pivoting deflector 16,20 describes both an individual one-part central pivoting deflector 16 and a multi-part device, which may or may not include the central pivoting deflector 16, for diverting or transferring an item of piece goods from one (delivering) to another (receiving) conveyor section 4a,4b. The transfer according to the invention refers to a line/track change of an item or flow of piece goods, which can be effected in both directions at substantially the same level of the conveyor sections 4a,4b.

The center pivot axis 18 in the transfer position is arranged downstream in relation to the conveying direction 6 of the delivering conveyor section 4, the distal end of the central pivot deflector being arranged downstream. If the delivering conveyor section 4 is the first conveyor section 4a (second conveyor section 4b), this is referred to as the first transfer position (second transfer position). If the transfer device 2 comprises two or more pivoting deflectors 16,20 (FIGS. 3+6: two outer pivoting deflectors 20), it is also possible to distinguish between a first and second passage position, in which the item of piece goods is not affected on the first or second conveyor section 4a,4b respectively.

The center strip 14, which can be as narrow or wide as required, can be embodied with or without a structural boundary between the conveyor sections 4a,4b. Both the level of a structural boundary on the center strip 14 and the level of the pivoting deflectors 16,20 is appropriately selected for the size of the piece goods, the conveyor speed and the fragility of the piece goods to be transferred.

In the figures, the pivoting angles (the angle covered by the respective pivoting deflector 16,20 between passage position and transfer position) correspond substantially to the width of the conveyor sections 4a,4b and therefore also to the length of the pivoting deflectors 16,20. The pivoting angles of the individual conveyor sections 4a,4b and pivoting deflectors 16,20, lengths of the pivoting deflectors 16,20 and widths of the conveyor sections 4a,4b can nonetheless differ from each other.

In FIG. 2, the length of the central pivoting deflector 16 is selected such that in the passage position the central pivoting deflector 16 covers the center strip 14 in the whole transfer region 12 and physically separates the conveyor sections 4a,4b. The central pivoting deflector 16 can also be shorter since any unintentional change of track is unlikely even without a physical separation because there is no incline between the conveyor sections 4a,4b at the same streaming level.

In the transfer positions, the central pivoting deflector 16 blocks the transport path of a flow of piece goods along the conveying direction 6a,6b of its conveyor section 4a,4b and diverts it to the other conveyor section 6b,6a. Precisely the same central pivoting deflector 16 diverts piece goods to both conveyor sections 4a,4b without the need for two separate pivoting deflectors 16,20. The central pivoting deflector 16 separates the conveyor sections 4a,4b from each other in the transfer region 12 (passage position) or is pivoted into the first or second transfer position in the first or second conveyor section 4a,4b respectively, and diverts the flow of piece goods either from the first to the second conveyor section 4a,4b or vice versa.

A pivoting device 26 pivots the pivoting deflector 16. The longer the pivoting deflector 16, the stronger the motors that are required. The faster the conveyor speed and the shorter the distance between piece goods with different destination trajectories, the faster it is necessary to pivot. The transfer device 2 can be used for both sorting a flow of piece goods and transferring a flow of piece goods in bulk. Sorting (successive piece goods being selectively diverted from one of the two conveyor sections 4a,4b to the first or second conveyor section 4a,4b) is associated with frequent changes of pivoting deflector position, so that rapid pivoting speeds are required for a high flow rate. When transferring a flow of piece goods in bulk, positional changes of the pivoting deflectors 16,20 only take place after a large number of successive piece goods have been transferred according to their specified destinations or transported straight onwards, and limited pivoting speeds does not affect the flow rate to the same extent.

Since the central pivoting deflector 16 is pivoted between three positions (two positions in the prior art as per FIG. 1), precise triggering by the pivoting device 26 is required, in particular because there is no level offset in the transfer direction to assist the transfer. The pivoting device 26 must be able to both accelerate and accurately brake the central pivoting deflector 16. The mechanical stability of the central pivoting deflector 16 in particular must also be guaranteed.

The invention is therefore highly suitable for redundancy functions in the case of multiple conveyor sections 4 (rerouting in the event of a disruption in a region ahead of or behind the transposition in the transfer region 12) and for load distribution (balancing an unevenly distributed load between at least two conveyor sections 4). For example, this can occur in a conveyor flow from check-in to x-ray devices, on a sorter, or on long sections in a tunnel.

Figure 3B:
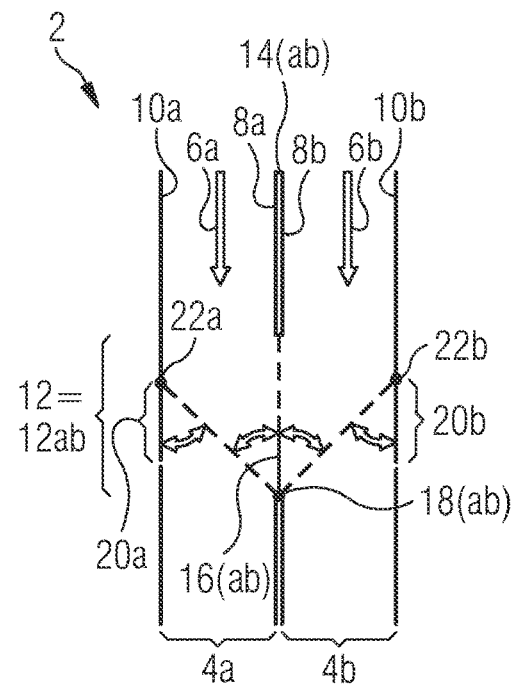
Figure 3C:
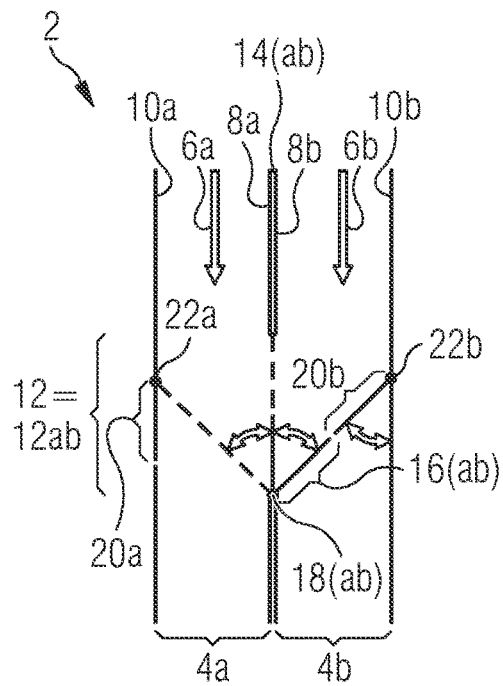

FIG. 3 shows a multi-part pivoting deflector 16,20 in first transfer position (FIG. 3a), passage position (FIG. 3b) and second transfer position (FIG. 3c) with similar functional principles as in FIG. 2. Due to the wing-like embodiment of the pivoting deflectors 16,20, these are shorter in comparison with FIG. 2 and motors of a lesser strength can be used. The pivoting device 26 triggers the comprised parts of the pivoting deflector 16,20 in a concerted and essentially simultaneous manner. In order to seal off the conveyor sections 4a,4b in the transfer positions, the central pivoting deflector 16(ab) and an outer pivoting deflector 20a,20b belonging to the respective conveyor section 4a,4b are each pivoted into the respective transfer positions. The central pivoting deflector 16 and the corresponding outer pivoting deflector 20a,20b are arranged in a substantially co-linear or co-planar manner in the transfer positions. This also includes a slight overlapping of the distal ends of the pivoting deflectors 16,20. The outer pivoting deflectors 20a,20b can pivot at their proximal ends about a respective outer pivot axis 22a,22b, this being arranged on and substantially orthogonal to the respective outer side 10a,10b, between the transfer position of their conveyor sections 4a,4b and the passage position. The distal end of the respective outer pivoting deflector 20a,20b in its respective transfer position points inwards towards the center strip 14 in its conveyor section 4a,4b, and the distal end of the outer pivoting deflector 20a,20b in the passage position is positioned along the outer side 10a,10b, so that in the first or second transfer position an item of piece goods is transferred or diverted by both the central pivoting deflector 16 and the first or second outer pivoting deflector 20a,20b.

The center pivot axis 18 is arranged downstream of the outer pivot axes 22a,22b. In the case of matching lengths of the pivoting deflectors 16,20 and matching widths of the conveyor sections 4a,4b, the outer pivot axes are arranged at substantially the same level. The width of the conveyor sections 4a,4b and the lengths of the pivoting deflectors 16,20 can also differ. As a result of the lower mass and shorter length, faster pivoting times are possible with a multi-part pivoting deflector 16,20 than with a one-part pivoting deflector 16,20. The one-part central pivoting deflector 16ab in the passage position does not completely separate the center strip 14 in the transfer region 12ab.

In the illustrated embodiment variants of the first and second transfer positions, the one or more pivoting deflectors 16,20 block the first or second conveyor section 4a,4b in the transfer region and are arranged obliquely between the first or second outer side 10a,10b in a conveying direction 6 towards the center strip 14ab. However, an arrangement of the pivoting deflectors 16,20 across the conveying direction 6 is also possible.

Figure 4:
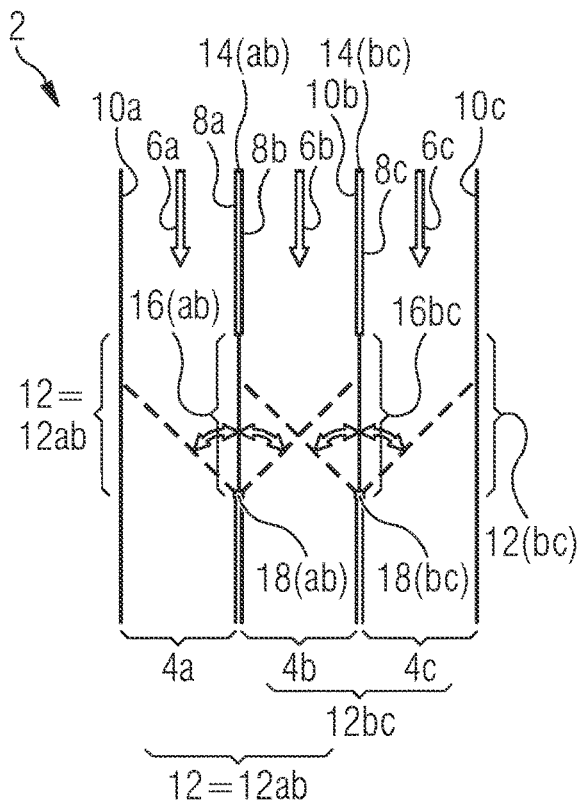
FIG. 4 shows a transfer device with three conveyor sections.

FIG. 4 shows a further embodiment variant of a transfer device 2 which comprises three conveyor sections 4a,4b,4c and has two central pivoting deflectors 16ab and 16bc between the first and second conveyor section 4a,4b and the second and further/third conveyor section 4b,4c respectively. For the sake of clarity, embodiment variants which can be realized with similar functionality and design using outer pivoting deflectors 20 as per FIGS. 3, 6+7 are not shown. FIG. 4 shows transfer regions 12ab,12bc which are arranged at the same level but can in principle also be arranged at different levels without any overlap or with only partial overlap. The embodiment according to FIG. 4 allows piece goods to be transferred from both the first and third/further conveyor section 4a,4c to the second conveyor section 4b. In order to achieve this, the central pivoting deflector 16ab must be pivoted into the first conveyor section 4a towards the first outer side 10a (first transfer position) and the further central pivoting deflector 16bc must be pivoted into the third conveyor section 4c towards the third outer side 10c (third/further transfer position). Other concurrent line changes are also possible. For example, the central pivoting deflector 16ab can be pivoted into the first conveyor section 4a and the further central pivoting deflector 16bc into the second conveyor section 4b for a concurrent change of track from the first to the second conveyor section 4a,4b and from the second to the further conveyor section 4b,4c.

Many different track changes can be performed, and multi-part pivoting deflectors 16,20 can be advantageous for this purpose, so that the functionalities of the central and outer pivoting deflectors 16,20 can be combined between the conveyor sections 4. In principle, any number of conveyor sections 4 and their transfer regions 12 can be arranged next to each other.

Figure 5:
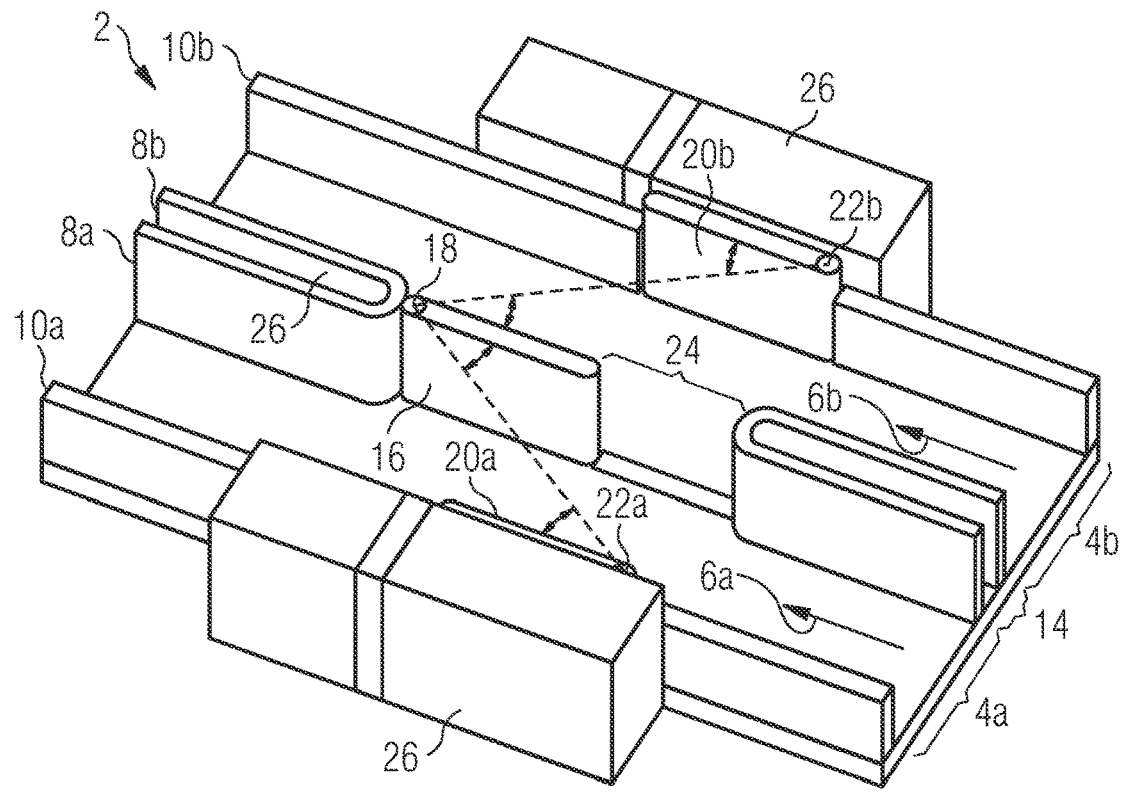
FIG. 5 shows a transfer device with a transfer aid.

FIG. 5 shows a further embodiment similar to that in FIG. 3b. A transfer aid 24 is arranged on the center strip 14 in the transfer region 12 in order to provide support for smooth diversion by the pivoting deflectors 16,20a,20b. A transfer aid 24 between the conveyors 4a,4b comprises solely or in combination a sliding plate, passive conveying means 24 (one or more passive transport rollers or similar), or active conveying means 24 which are driven in both directions by the pivoting device 26 according to the transfer direction (i.e. depending on the position of the pivot axes 16,20).

The pivoting device 26 comprising the triggerable drives, e.g. servo-drives, is positioned close to or in the pivoting deflectors 16,20a,20b in each case, and pivots the pivoting deflectors 16,20a,20b in an essentially simultaneous manner in order to achieve concerted and coordinated switching between the transfer positions and the passage position. Depending on the performance requirements, the pivoting deflector 16,20 is a one-part pivoting deflector, comprises only the central pivoting deflector 16 or also comprises outer pivoting deflectors 20a,20b.

It is common to all embodiments that an item of piece goods is initially transported on and along the conveying direction 6 of the delivering conveyor 4 to a transfer region 12. Each of the conveyor sections 4a,4b,4c can act as the delivering conveyor. The one or more pivoting deflectors 16,20 change by pivoting their position (transfer position or passage position) or remain in their previously set position. In order to transfer an item of piece goods, the pivoting deflectors 16,20 are pivoted into the delivering conveyor 4, the distal end of the central pivoting deflector 16 in the transfer position of the delivering conveyor 4 pointing towards the outer side 10 thereof. The item of piece goods is diverted by the pivoting deflector 16 and thus transferred onto the receiving conveyor section 4. Onward transport along the transport direction 6 of the receiving conveyor takes place there.

The transfer is achieved by virtue of the geometric arrangement of the pivoting deflectors 16,20 in the transfer positions if the conveyor sections 4 alone are actively driven. The transfer can be supported by driving the diverting surfaces of the pivoting deflectors 16,20, said diverting surfaces being equipped with a conveying means (e.g. a circulating conveyor band). The transfer can be supported by passively following or actively driving a conveying means 24 (transfer aid) which is arranged in the conveyor surface on the center strip 14 in the transfer region 12.

In order to control the speed and spacing of the piece goods in the transfer region 12, the conveyor sections 4a,4b can have triggerable conveyor regions consecutively arranged along the conveying directions 6a,6b (discontinuous belts with consecutive switching) ahead of and/or behind the transfer region 12 with individually triggerable speeds, in order to sequentially accelerate or brake piece goods. According to an embodiment variant, the transfer device 2 comprises detection means, e.g. photoelectric barriers and/or cameras, in order to detect the inflow of the piece goods and trigger the transfer device 2 as a function of the detection.

The transfer device 2 according to the invention therefore requires only half as much space as the conventional solution and is consequently very flexible. Furthermore, any components required in addition to the transfer region 12 are required only once and not duplicated, such that the solution is more economical. This compactness allows novel conveyor system layouts. The transfer device 2 can also function as a singulator and merger depending on the desired sorting direction. These functions can be switched to alternate sides. The conveyor sections 4a,4b can swap functions (delivering or receiving conveyor 4a,4b) according to the positioning of the pivoting deflectors. This is useful for transposition.

Figure 6A:
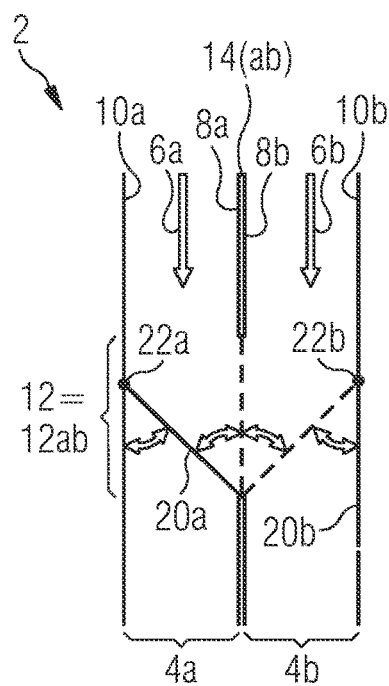
FIG. 6 shows transfer positions with two outer pivoting deflectors.
Figure 6B:
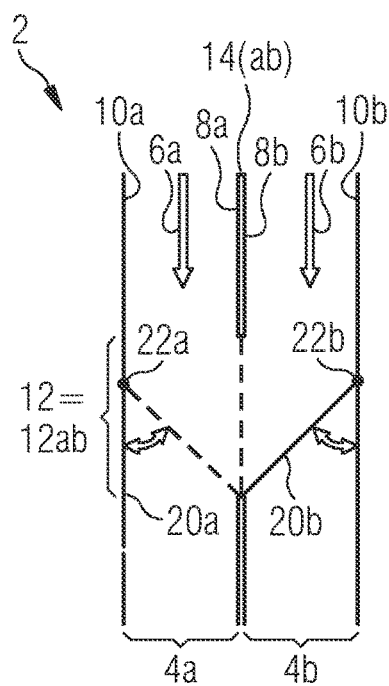

FIG. 6 shows a transfer device 2 with two outer pivoting deflectors 20a,20b but without a central pivoting deflector 16. Although this means that two motors are required for pivoting purposes, they can be easily positioned at the edge of the conveyor sections 4a,4b, thereby simplifying installation and maintenance. Moreover, only two positions have to be set for each of the pivoting deflectors 20a,20b instead of three as in the case of a central pivoting deflector 16 (FIG. 2).

The invention claimed is:

1. A transfer device, comprising:
    a) first and second conveyor sections, respectively having a first and a second conveying direction, a first and a second inner side, and a first and a second outer side, said first and second conveyor sections being arranged next to each other in a transfer region with substantially parallel conveying directions and being separated from one another by a center strip that is arranged between said first and said second inner side;
    b) one or more pivoting deflectors having respective pivot axes arranged laterally of said first or second conveyor section, said one or more pivoting deflectors being pivotable about said pivot axes and being configured to selectively place the transfer device into a first and a second transfer position and a passage position, wherein:
        in the first or second transfer position, one or more of said pivoting deflectors block said first or second conveyor section in the transfer region by extending transversely to the conveying direction or obliquely from said first or second outer side in a conveying direction towards said center strip, so that an item of piece goods is transferred from said first or second conveyor section to said second or first conveyor section, respectively, wherein said pivoting deflectors in the first and second transfer position are arranged at substantially the same level of said conveyor sections, so that piece goods at the same level can be transferred either from said first to said second conveyor section or from said second to said first conveyor section;
        in the passage position, one or more of said pivoting deflectors are arranged parallel to said center strip, so that items of piece goods on said conveyor section or conveyor sections are not affected;
    c) a pivoting device configured for selectively pivoting said one or more pivoting deflectors into the transfer positions and into the passage position; and
    each of said one or more pivoting deflectors having a distal end and a proximal end and being formed as a central pivoting deflector or as one or two outer pivoting deflectors; wherein
        said central pivoting deflector is configured to pivot at said proximal end about a center pivot axis arranged on and substantially orthogonal to said center strip;
        said one or two outer pivoting deflectors are configured to pivot at said proximal ends about outer pivot axes arranged on and substantially orthogonal to the respective said outer side;
        the outer pivot axes are arranged upstream of or at the same level as the center pivot axis;
        in the first or second transfer position, said distal end of at least one of said pivoting deflectors is positioned into said first or second conveyor section, respectively, and in the passage position at least one of said pivoting deflectors is positioned parallel to said center strip, so that in the first or second transfer position an item of piece goods is transferred by way of said one or more pivoting deflectors in the transfer region from said first to said second conveyor section or from said second to said first conveyor section; and said pivoting device is configured to selectively pivot said outer pivoting deflector substantially simultaneously with said central pivoting deflector into either a transfer position or into the passage position.

2. The transfer device according to claim 1, wherein said central pivoting deflector and said first or second outer pivoting deflector in the first or second transfer position are positioned substantially co-linearly, so that an item of piece goods is transferred by both said central pivoting deflector and said outer pivoting deflector from the respective conveyor section onto the respectively adjacent said conveyor section.

3. The transfer device according to claim 1, wherein said one or more pivoting deflectors are formed with drivable diverting surfaces and said pivoting device is configured to drive said diverting surfaces.

4. The transfer device according to claim 1, wherein said conveyor sections in said transfer region form a conveyor surface which is level or only inclined along the conveying directions.

5. The transfer device according to claim 1, further comprising an actively drivable or passive conveying means arranged on said center strip within said transfer region and configured to assist a transfer between said conveyor sections, or a center strip forming a center line substantially without a width in said transfer region.

6. The transfer device according to claim 1, which comprises:
   a) a further conveyor section with a further conveying direction, a further inner side and a further outer side, said further conveyor section being arranged next to said second conveyor section with substantially parallel conveying directions in a further transfer region, and being separated therefrom by a further center strip arranged between said second outer side and said further inner side;
   b) one or more further pivoting deflectors having respective further pivot axes arranged laterally of said further conveyor section, said one or more further pivoting deflectors being pivotable about said further pivot axes are being configured to form said transfer device with a second further and/or a further transfer position, wherein:
      in the second further transfer position or in the further transfer position, said one or more further pivoting deflectors block said second or said further conveyor section in said further transfer region by way of an arrangement extending transversely to the conveying direction or obliquely between said second inner side or said further outer side in a conveying direction towards said further center strip, so that an item of piece goods is transferred from said second or further conveyor section to said further or second conveyor section respectively, wherein said further pivoting deflectors in the second further and the further transfer position are arranged at substantially the same level of said conveyor sections, so that piece goods at the same level can be transferred from either said second to said further conveyor section or from said further to said second conveyor section;
      in the passage position, one or more of said further pivoting deflectors are arranged parallel to said further center strip so that piece goods on said conveyor sections are not affected; and
   c) wherein said pivoting device is configured to selectively pivot said one or more further pivoting deflectors into the further transfer positions and into the passage position.

7. The transfer device according to claim 6, which comprises one or more conveyor regions arranged on one or more of said conveyor sections ahead of and/or behind the transfer region and can be driven at a conveyor speed that is individual and settable in each case.

8. A method for selectively transferring an item of piece goods from a first conveyor section to a second conveyor section, the first and second conveyor sections having respectively a first and a second conveying direction, a first and a second inner side and a first and a second outer side, the method comprising:
   a) transporting an item of piece goods on the first or second conveyor section along the first or second conveying direction towards a transfer region, wherein in the transfer region the conveyor sections are arranged next to one another, with substantially parallel conveying directions, and are separated from one another by a center strip that is arranged between the first and second inner sides;
   b) pivoting one or more pivoting deflectors about respective pivot axes that are respectively arranged laterally of one of the conveyor sections, between a first transfer position, a passage position, and a second transfer position, wherein:
      the pivot axes are each arranged orthogonally to and on the center strip between two conveyor sections;
      in the first or second transfer position, one or more of the pivoting deflectors block the first or second conveyor section in the transfer region by extending transversely to the conveying direction or obliquely between the first or second outer side and the center strip in a conveying direction, so that in the first or second transfer position, piece goods are transferred at substantially the same level of the conveyor sections either from the first to the second conveyor section or from the second to the first conveyor section;
      in the passage position, one or more of the pivoting deflectors are arranged parallel to the center strip, so that the piece goods on the conveyor sections are not affected by the pivoting deflector or pivoting deflectors; and
   c) transporting the item of piece goods onward through the transfer region and further downstream on one of the conveyor sections; and
   wherein each of the one or more pivoting deflectors have a distal end and a proximal end, and is formed as at least one of a central pivoting deflector or as one or two outer pivoting deflectors, and
   the central pivoting deflector can pivot at its proximal end about its center pivot axis, this being arranged on and substantially orthogonal to the center strip;
   the one or more outer pivoting deflectors can pivot at their proximal ends about their outer pivot axes, these being arranged on and substantially orthogonal to the respective outer side;

the outer pivot axis or outer pivot axes are arranged upstream of or at the same level as the center pivot axis;
in the first or second transfer position, the distal end of at least one of the pivoting deflectors is pivoted into the first or second conveyor section respectively, and in the passage position at least one of the pivoting deflectors is arranged parallel to the center strip, so that in the first or second transfer position an item of piece goods is transferred by way of the pivoting deflectors in the transfer region from the first to the second conveyor section or from the second to the first conveyor section; and
selectively and simultaneously pivoting the one or more outer pivoting deflectors and/or the central pivoting deflector into either first or second the transfer positions or the passage position.

9. The method according to claim 8, wherein the conveyor sections in the transfer region form a conveyor surface which is level or is inclined only along the conveying directions.

10. The method according to claim 8, which further comprises driving diverting surfaces of the one or more pivoting deflectors while the one or more pivoting deflectors are positioned in the transfer positions and/or being pivoted into the transfer positions.

11. The method according to claim 8, which comprises operating in follower mode or actively driving a conveying device which is arranged in the conveyor surface on the center strip in the transfer region, so that the transfer of an item of piece goods between the conveyor sections is assisted, or embodying a center strip as a center line so that the center line has no width of its own in the transfer region.

12. The method according to claim 8, which comprises the further method steps:
a) transporting an item of piece goods on the second conveyor section or a further conveyor section, wherein the further conveyor section has a further conveying direction, a further inner side and a further outer side, and in a further transfer region the further conveyor section is arranged next to the second conveyor section and is separated therefrom by a further center strip arranged between the second outer side and the further inner side, and the second conveyor section and the further conveyor section have substantially parallel conveying directions in the transfer region;
b) pivoting one or more of the further pivoting deflectors about a further pivot axis arranged laterally of the further conveyor section into at least one further transfer position or a passage position, wherein the one or more further pivoting deflectors in the one or more further transfer positions block the second or the further conveyor section by an arrangement extending transversely to the conveying direction or obliquely in a conveying direction between the second inner side or further outer side and the further center strip, and in the passage position the one or more further pivoting deflectors are arranged along the further center strip, wherein in the second further or further transfer position the pivoting deflectors are arranged at substantially the same level, so that piece goods at the same level are transferred either from the second conveyor section to the further conveyor section or from the further conveyor section to the second conveyor section; and
c) transporting the item of piece goods onward through the further transfer region and further downstream on one of the conveyor sections.

13. The method according to claim 8, which comprises:
triggering conveyor regions which are arranged on the conveyor sections upstream and/or downstream along the conveying directions, ahead of and/or behind the transfer region, using individually settable conveyor speeds in each case.

14. A transfer device, comprising:
a) first and second conveyor sections, respectively having a first and a second conveying direction, a first and a second inner side, and a first and a second outer side, said first and second conveyor sections being arranged next to each other in a transfer region with substantially parallel conveying directions and being separated from one another by a center strip that is arranged between said first and said second inner side;
a further conveyor section with a further conveying direction, a further inner side and a further outer side, said further conveyor section being arranged next to said second conveyor section with substantially parallel conveying directions in a further transfer region, and being separated therefrom by a further center strip arranged between said second outer side and said further inner side;
b) one or more pivoting deflectors having respective pivot axes arranged laterally of said first or second conveyor section, said one or more pivoting deflectors being pivotable about said pivot axes and being configured to selectively place the transfer device into a first and a second transfer position and a passage position, wherein:
in the first or second transfer position, one or more of said pivoting deflectors block said first or second conveyor section in the transfer region by extending transversely to the conveying direction or obliquely from said first or second outer side in a conveying direction towards said center strip, so that an item of piece goods is transferred from said first or second conveyor section to said second or first conveyor section, respectively, wherein said pivoting deflectors in the first and second transfer position are arranged at substantially the same level of said conveyor sections, so that piece goods at the same level can be transferred either from said first to said second conveyor section or from said second to said first conveyor section;
in the passage position, one or more of said pivoting deflectors are arranged parallel to said center strip, so that items of piece goods on said conveyor section or conveyor sections are not affected;
one or more further pivoting deflectors having respective further pivot axes arranged laterally of said further conveyor section, said one or more further pivoting deflectors being pivotable about said further pivot axes are being configured to form said transfer device with a second further and/or a further transfer position, wherein:
in the second further transfer position or in the further transfer position, said one or more further pivoting deflectors block said second or said further conveyor section in said further transfer region by way of an arrangement extending transversely to the conveying direction or obliquely between said second inner side or said further outer side in a conveying direction towards said further center strip, so that an item of piece goods is transferred from said second or further conveyor section to said further or second conveyor section respectively, wherein said further pivoting deflectors in the second further and the further transfer position are arranged at substantially the same level of said conveyor sections, so that piece goods at the same level can be transferred from either said second to said further conveyor section or from said further to said second conveyor section;

in the passage position, one or more of said further pivoting deflectors are arranged parallel to said further center strip so that piece goods on said conveyor sections are not affected; and c) a pivoting device configured for selectively pivoting said one or more pivoting deflectors into the transfer positions and into the passage position, and said pivoting device being configured to selectively pivot said one or more further pivoting deflectors into the further transfer positions and into the passage position; and one or more conveyor regions arranged on one or more of said conveyor sections ahead of and/or behind the transfer region and can be driven at a conveyor speed that is individual and settable in each case.

15. A method for selectively transferring an item of piece goods from a first conveyor section to a second conveyor section, the first and second conveyor sections having respectively a first and a second conveying direction, a first and a second inner side and a first and a second outer side, the method comprising:

a) transporting an item of piece goods on the first or second conveyor section along the first or second conveying direction towards a transfer region, wherein in the transfer region the conveyor sections are arranged next to one another, with substantially parallel conveying directions, and are separated from one another by a center strip that is arranged between the first and second inner sides;

transporting an item of piece goods on the second conveyor section or a further conveyor section, wherein the further conveyor section has a further conveying direction, a further inner side and a further outer side, and in a further transfer region the further conveyor section is arranged next to the second conveyor section and is separated therefrom by a further center strip arranged between the second outer side and the further inner side, and the second conveyor section and the further conveyor section have substantially parallel conveying directions in the transfer region;

b) pivoting one or more pivoting deflectors about respective pivot axes that are respectively arranged laterally of one of the conveyor sections, between a first transfer position, a passage position, and a second transfer position, wherein:

the pivot axes are each arranged orthogonally to and on the center strip between two conveyor sections;

in the first or second transfer position, one or more of the pivoting deflectors block the first or second conveyor section in the transfer region by extending transversely to the conveying direction or obliquely between the first or second outer side and the center strip in a conveying direction, so that in the first or second transfer position, piece goods are transferred at substantially the same level of the conveyor sections either from the first to the second conveyor section or from the second to the first conveyor section;

in the passage position, one or more of the pivoting deflectors are arranged parallel to the center strip, so that the piece goods on the conveyor sections are not affected by the pivoting deflector or pivoting deflectors; and pivoting one or more further pivoting deflectors about a further pivot axis arranged laterally of the further conveyor section into at least one further transfer position or a passage position, wherein the one or more further pivoting deflectors in the one or more further transfer positions block the second or the further conveyor section by an arrangement extending transversely to the conveying direction or obliquely in a conveying direction between the second inner side or further outer side and the further center strip, and in the passage position the one or more further pivoting deflectors are arranged along the further center strip, wherein in the second further or further transfer position the pivoting deflectors are arranged at substantially the same level, so that piece goods at the same level are transferred either from the second conveyor section to the further conveyor section or from the further conveyor section to the second conveyor section; and c) transporting the item of piece goods onward through the transfer region and further downstream on one of the conveyor sections, and transporting the item of piece goods onward through the further transfer region and further downstream on one of the conveyor sections.

* * * * *